(12) United States Patent
Saab et al.

(10) Patent No.: US 11,507,659 B2
(45) Date of Patent: *Nov. 22, 2022

(54) ENHANCEMENTS TO IMPROVE SIDE CHANNEL RESISTANCE

(71) Applicant: CRYPTOGRAPHY RESEARCH, INC., San Jose, CA (US)

(72) Inventors: Sami Saab, San Francisco, CA (US); Elke De Mulder, Kirkland, WA (US); Pankaj Rohatgi, Los Altos, CA (US); Craig E. Hampel, Los Altos, CA (US); Jeremy Cooper, San Francisco, CA (US); Winthrop Wu, Pleasanton, CA (US)

(73) Assignee: Cryptography Research, Inc., San Jose, CA (US)

( * ) Notice: Subject to any disclaimer, the term of this patent is extended or adjusted under 35 U.S.C. 154(b) by 244 days.

This patent is subject to a terminal disclaimer.

(21) Appl. No.: 17/033,568

(22) Filed: Sep. 25, 2020

(65) Prior Publication Data
US 2021/0026956 A1    Jan. 28, 2021

Related U.S. Application Data

(63) Continuation of application No. 16/061,409, filed as application No. PCT/US2016/056628 on Oct. 12, 2016, now Pat. No. 10,789,358.

(30) Foreign Application Priority Data

Dec. 17, 2015    (WO) ................ PCT/BE2015/000067

(51) Int. Cl.
    *G06F 21/55*     (2013.01)
    *G06F 21/62*     (2013.01)

(52) U.S. Cl.
CPC ........ *G06F 21/556* (2013.01); *G06F 21/6254* (2013.01); *G06F 2221/034* (2013.01)

(58) Field of Classification Search
CPC ..................................................... G06F 21/556
See application file for complete search history.

(56) References Cited

U.S. PATENT DOCUMENTS 6,654,884 B2    11/2003    Jaffe et al.
7,949,883 B2    5/2011    Shu et al.
(Continued)

OTHER PUBLICATIONS

EP Communication Pursuant to Rule 164(1) EPC dated Jul. 23, 2019 re: EP Appln. No. 16876218.5. 10 Pages.
(Continued)

*Primary Examiner* — Simon P Kanaan
(74) *Attorney, Agent, or Firm* — Lowenstein Sandler LLP

(57) ABSTRACT

Embodiments herein facilitate resisting side channel attacks through various implementations and combinations of implementations. In embodiments, this is accomplished by preventing sensitive data from consecutively following other data through potentially vulnerable resources which otherwise may cause data to leak. Where such vulnerabilities to attacks are known, suspected, or as a proactive precaution, a cleaner can be used to inhibit the sensitive data from passing through the vulnerable areas consecutively and thus inhibit the leakage. Embodiments also envision utilizing certain types of circuits to assist in preventing leakage. By using such circuits one can reduce or even potentially eliminate the requirement for cleaners as mentioned previously.

20 Claims, 10 Drawing Sheets

(56) References Cited

U.S. PATENT DOCUMENTS

| | | |
|---|---|---|
| 7,996,671 B2 | 8/2011 | Chheda et al. |
| 8,094,811 B2 | 1/2012 | Yokota et al. |
| 8,914,616 B2 | 12/2014 | Craske |
| 2006/0098814 A1 | 5/2006 | Al-Khoraidly et al. |
| 2008/0126766 A1 | 4/2008 | Chheda et al. |
| 2008/0309396 A1 | 12/2008 | Lee |
| 2013/0129083 A1 | 5/2013 | Fujino |
| 2014/0040536 A1 | 2/2014 | Nakashima |
| 2014/0115405 A1 | 4/2014 | Condorelli et al. |
| 2015/0270952 A1 | 9/2015 | Sethumadhavan et al. |
| 2015/0350239 A1 | 12/2015 | Kruglick |
| 2015/0379309 A1 | 12/2015 | Yannette et al. |
| 2016/0275288 A1 | 9/2016 | Sethumadhavan et al. |
| 2017/0060637 A1 | 3/2017 | Persson et al. |
| 2018/0046808 A1 | 2/2018 | Cammarota et al. |
| 2019/0324756 A1 | 10/2019 | Chappell et al. |
| 2020/0034538 A1 | 1/2020 | Woodward et al. |

OTHER PUBLICATIONS

EP Extended European Search Report dated Nov. 27, 2019 re: EP Appln. No. 16876218.5. 10 Pages.

Notification Concerning Transmittal of International Preliminary Report on Patentability dated Jun. 28, 2018 re: Int'l Appln. No. PCT/US2016/056628. 7 Pages.

Notification of Transmittal of the International Search Report and the Written Opinion of the International Searching Authority dated Feb. 24, 2017 re: Int'l Appln. No. PCT/US16/056628. 19 Pages.

ENHANCEMENTS TO IMPROVE SIDE CHANNEL RESISTANCE

RELATED APPLICATIONS

This application claims priority to International Application No. PCT/BE2015/000067 filed 17 Dec. 2015, the content of which is incorporated herein by reference in its entirety.

DETAILED DESCRIPTION OF THE EMBODIMENTS

Embodiments herein facilitate resisting side channel attacks through various implementations and combinations of implementations. These side channel attacks can take place due to leakage and the illicit analysis of, e.g., power consumption, electromagnetism and/or timing information at resources (e.g., buffers, arithmetic logic units, data paths, busses, etc.) within a computer system. Leakage points within these resources generally result from the charging/discharging of the resources, which can occur when, e.g., data within a resource is changed from one value to another. Such leaks can allow sensitive information such as from shares of an encryption scheme to effectively be obtained and compromised as it passes through and is otherwise used by those resources.

Figure 1:
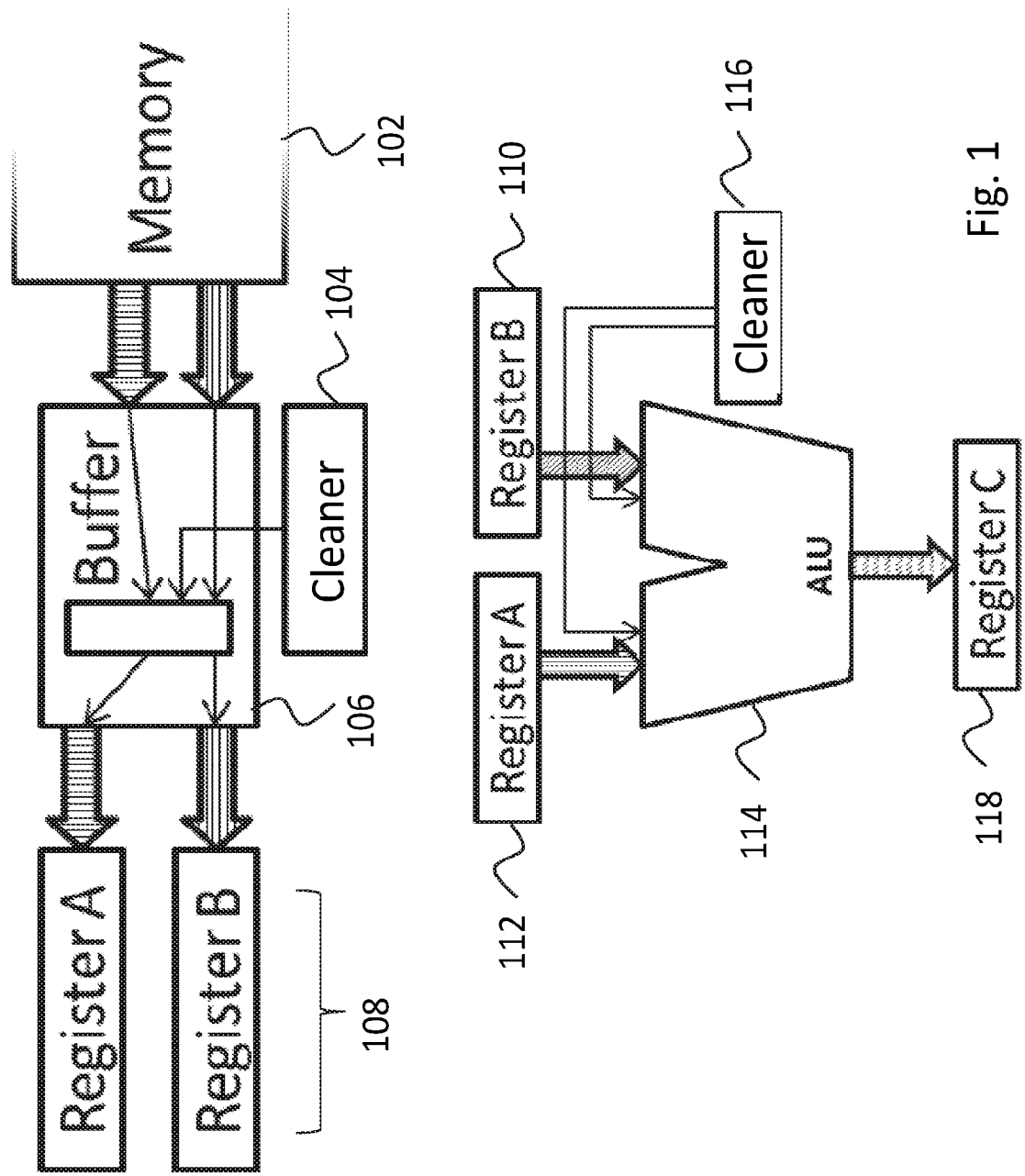
FIG. 1 is a block diagram depicting examples of embodiments disclosed herein as environments used therewith.

FIG. 1 depicts examples of contemplated embodiments, where an example depicting a buffer is first described. Referring to FIG. 1, sensitive information may pass from a memory 102 to a buffer 106 and then to registers A and B 108. Of particular concern, two pieces of related information (e.g., shares of an encryption scheme) may consecutively follow one another in a back-to-back manner through the buffer. Were the buffer to "leak" information in one or more of the ways mentioned previously, it may be possible to determine the contents of information from those shares (e.g., by determining the Hamming distance between the two consecutive data values) and compromise the encryption scheme. In embodiments, where such a leak is known, suspected, or as a proactive precaution, a cleaner 104 can be used to prevent the sensitive data from leaking. Embodiments envision any number of ways that leaks can be measured/confirmed or information received that would cause suspicion that a leak exists.

Embodiments envision that cleaners such as cleaner 104 can take a number of forms (or combinations of forms). In one example, cleaner 104 is a device for pre-charging the circuit, effectively erasing any data in the buffer 106. In another, the cleaner 104 can be a processor (either the main processor or a specialized one) that inserts particular data (e.g., random data, all zeros, etc.) into the buffer 106, again effectively erasing any data that was previously associated with the leakage point. These aforementioned embodiments generally envision the existence of an instruction that causes the cleaner 104 to implement a cleaning operation (i.e., to change the pertinent data associated with the leakage point in some manner). In addition, such particular data as mentioned previously can also be strategically inserted into the buffer 106 via memory 102 so as to separate what would otherwise be back-to-back sensitive data.

As mentioned, cleaning operations in the contexts mentioned previously are generally triggered by identifying that there is at least a possibility that back-to-back sensitive data may pass through a resource such as buffer 106 that may be "leaking" information. Embodiments that facilitate identifying such back-to-back data passing through potentially vulnerable resources (and subsequently initiate a cleaning operation) will be described further below. Such embodiments envision various operations being performed directly by the microarchitecture, which can facilitate efficiency and speed.

Another type of example resource that may also be vulnerable to leaks is an arithmetic logic unit (ALU) 114, also depicted in FIG. 1. Again, a cleaner 116 as described herein can be used to prevent leakage of the type mentioned previously as sensitive back-to-back information travels from Registers A and B (112 and 110, respectively) through ALU 114 to Register C 118.

While FIG. 1 depicts certain example resources (i.e., buffers and ALUs), it should be understood that embodiments envision operation with (and as an integral part of) any number of different types of resources that may be susceptible to leaks.

Embodiments also envision that certain electronic components can be utilized as a part of various resources to effectively assist in inhibiting leaks. Specifics of these embodiments will be described further below.

Figure 2:
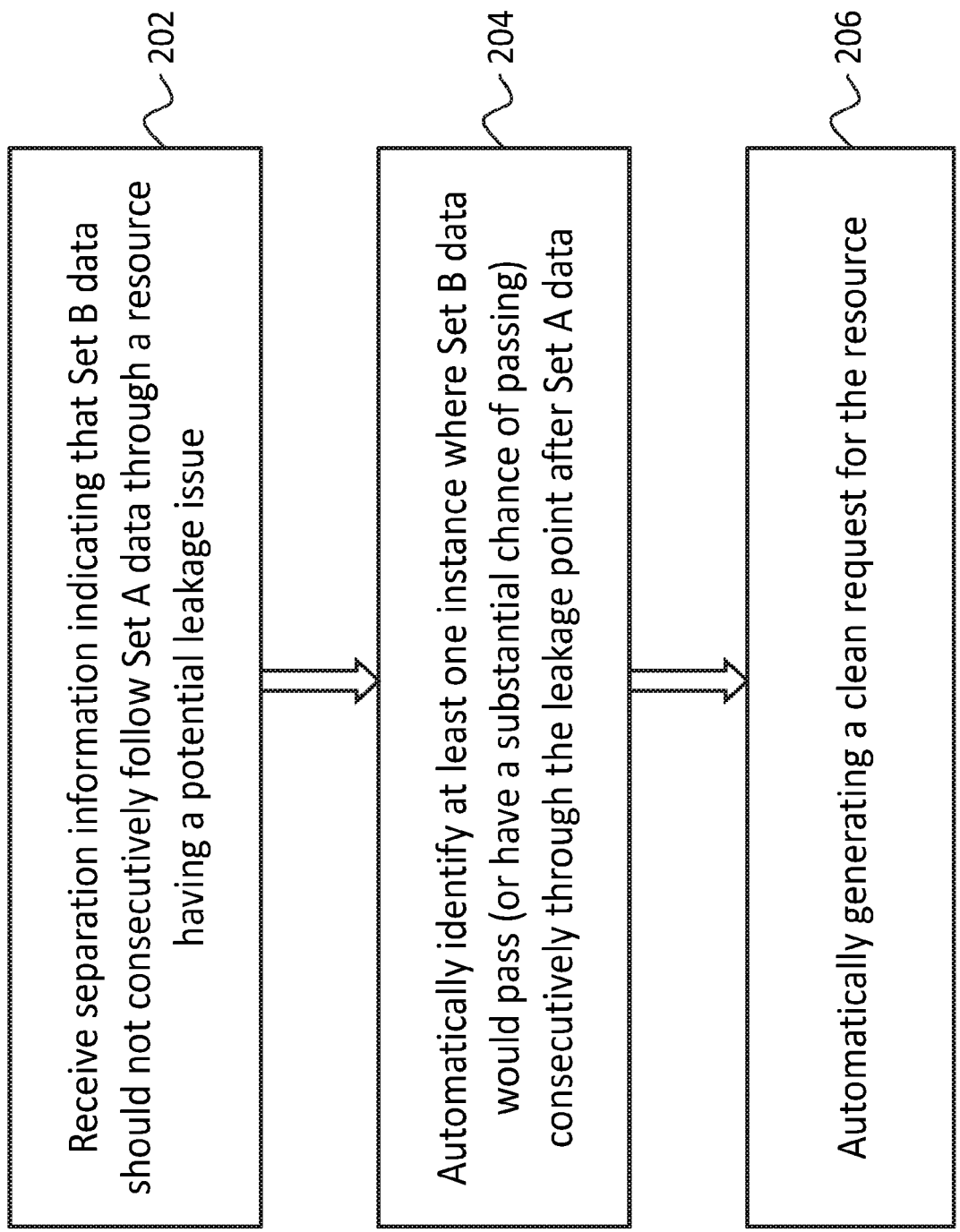
FIG. 2 is a flow diagram depicting high-level embodiments.

Embodiments to facilitate automating identifying that back-to-back sensitive data may be passing (or potentially passing) through vulnerable resources and that a clean request should therefore be initiated are depicted by FIG. 2. Referring now to FIG. 2, separation information is received indicating that certain data should not consecutively follow other data through a resource (or multiple resources). More specifically, in embodiments, sets of data can be established such that, e.g., data from Set B should not consecutively follow data from Set A. This is generally indicated by block 202. In embodiments, this information is conveyed within a high-level programming language such as C, and received by a compiler. The compiler then inserts the necessary machine language instructions to implement a cleaning operation during execution or otherwise takes steps to ensure that the sensitive data (e.g., data from Sets A and B) does not pass consecutively through a vulnerable resource.

The terms Set A and Set B are used for explanation herein and are envisioned to contain data (and/or variables containing data) that may be sensitive and should not consecutively follow (i.e., they should be separated from) one another when passing through resources that may be prone to leaks (i.e., data from Set B including Set B's variables should not consecutively follow data from Set A including Set A's variables).

Once this separation information is received, the next step is to automatically identify at least one instance where Set B data would pass (or have a substantial chance of passing) consecutively through the leakage point after Set A data, as indicated by step 204. For example, the compiler would consider the various operations that would take place in the course of executing the compiled code, and can identify that, e.g., data from Set B would (or is reasonably likely to) consecutively follow data from Set A through a resource potentially vulnerable to leakage. Then, upon detecting the existence of such an instance, a cleaning request would be automatically generated for the resource (step 206) such that the sensitive data that would otherwise consecutively pass through the resource is separated by other data (in some manner) as it travels through or is otherwise utilized by the resource. (E.g., a clean instruction is generated that would be executed after Set A data passes through the resource to ensure the data at the leakage point therein does not immediately change from Set A data to Set B data, but rather that the data value is first changed to some intermediate value.) As will be explained below, embodiments envision that, e.g., a cleaning operation can be generated when either 1) it is affirmatively detected that Set B data follows Set A data consecutively through a leakage point, or 2) just when Set A data passes through a leakage point having merely identified the existence of Set B data and that it should not pass through a leakage point after Set A data.

Embodiments envision that the compiler (and other devices envisioned herein) can have a sensitive and non-sensitive mode, such that the sensitive mode can be turned on only when, e.g., there is information from various sets such as Set A and Set B that is sensitive and should not pass consecutively through vulnerable resources as described previously. By operating in non-sensitive mode, it is envisioned that the compiler and its output can execute more quickly.

Embodiments contemplate any number of ways for automatically identifying whether sensitive back-to-back data from, e.g., Sets A and B will pass through a potentially vulnerable resource, necessitating a cleaning operation or the like. In some embodiments, this is implemented by use of computer-implemented instructions that access the data (or associated variables) at issue. An example of this, where the paths of the sensitive data are considered in advance of the data proceeding down those paths (i.e., in advance of execution) is now discussed with regard to FIG. 3.

Figure 3:
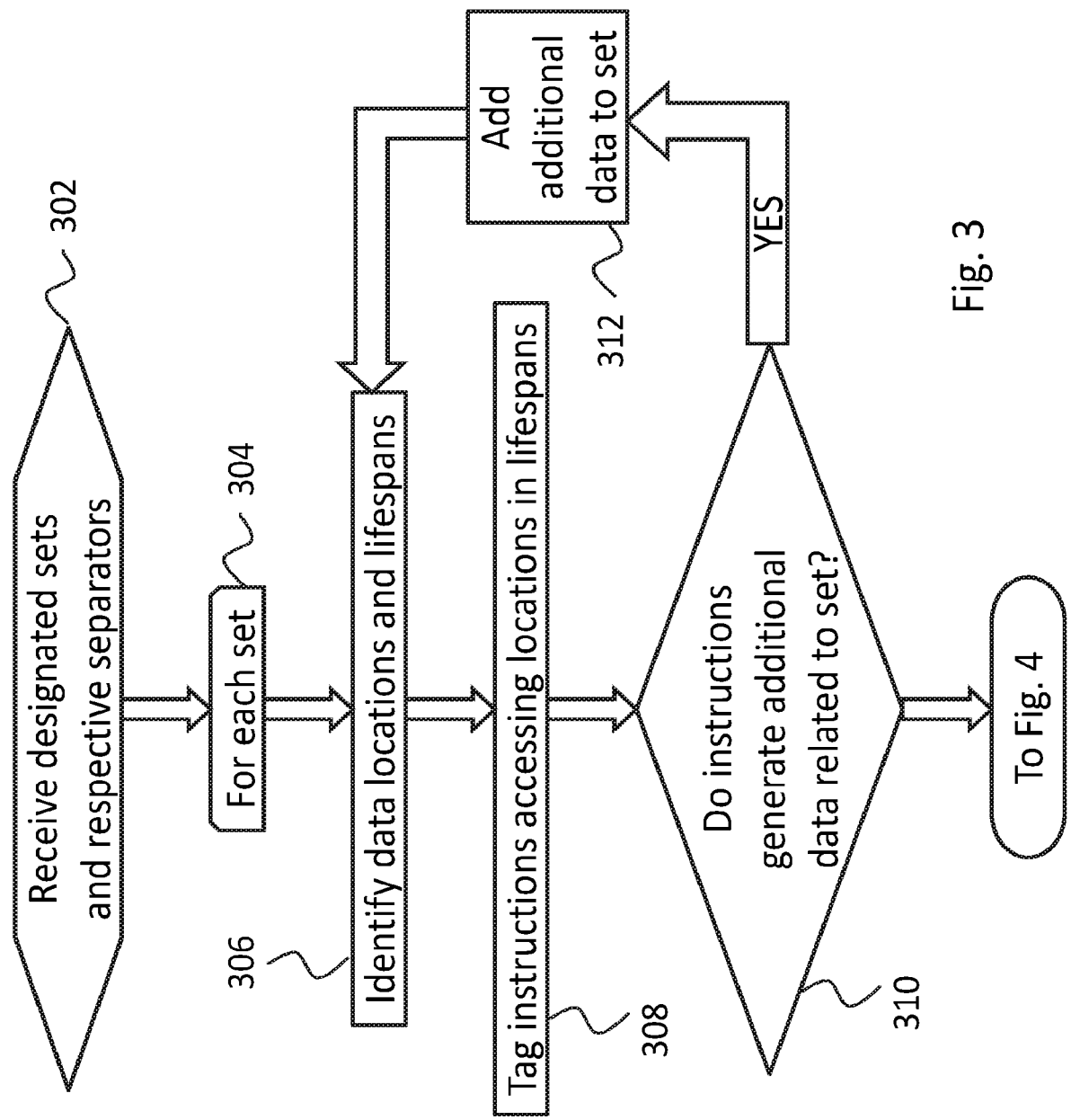
FIG. 3 is a flow diagram depicting first embodiments.

Referring to FIG. 3, designated sets of data and/or sets of variables anticipated to contain data that may be sensitive (i.e., that may need to be separated from other data as described previously), along with an indication of the data from which they need to be kept separate (separators), are received, as indicated by block 302. Thus, for example, a high-level programming language such as C can contain descriptors indicating which sets (e.g., Set A and Set B) may contain sensitive data/variables that should not pass through or be utilized by certain (or possibly any) resources in back-to-back fashion. In this way, a programmer can write a high-level program that will utilize and process sensitive encryption-related data and (knowing that certain data or future contents of variables could compromise the encryption scheme if information from their values were ascertained) simply state in the program that, e.g., data from certain sets should not consecutively pass through one or more resources (e.g., simply state that Set A data should be kept separate from Set B data). The compiler then receives this information, determines whether (at run-time) any data that should stay "separated" will take the same path through one or more potentially vulnerable resources, and implement a countermeasure (e.g., insert a "clean" instruction) to prevent the sensitive data from consecutively traveling through one or more vulnerable resources along that path. In embodiments, a compiler could also be programmed to automatically determine when a share has been created from a set, thus creating a new set. The compiler would then implicitly define that new set with the appropriate separators for that data; after which, the logic proceeds as if explicitly defined by the programmer.

Once the sets and separators have been received, embodiments envision that computer-related instructions associated with data in the set will be tagged such that the instruction is then recognized (i.e., designated) as being affiliated with the data. Thus, for example, if it is determined by a compiler that a particular instruction (e.g., an "add" instruction) contains a variable or value from Set A (which needs to be kept separate from, e.g., data from Set B), then that instruction is associated with Set A. If the compiler finds that an instruction associated with Set B immediately follows an instruction associated with Set A through a vulnerable resource, then a cleaning operation may be implemented since there is at least a reasonable likelihood that Set B data may consecutively follow Set A data. In embodiments, it is envisioned that various degrees of partial or full overlap (e.g., the degree and specificity of data path overlap between the data of Set A and Set B) and the extent of the vulnerability of various resources (e.g., the extent and accessibility of the leakage) can be factors used to decide whether to trigger a cleaning operation. Also, in addition to associating instructions with a set having data or variables used by those instructions, embodiments also envision that instructions that utilize data generated from sensitive data can also be tagged. Thus, for example, an instruction/operation utilizing the sum of two numbers, where at least one of those numbers comes from, e.g., Set A, can itself be designated as affiliated with Set A.

Referring still to FIG. 3, the previously-mentioned concepts are set forth in additional detail, as envisioned by various embodiments. Specifically, once the data sets and separators have been received, then for each set (block 304) the corresponding data locations of the data/variables and associated lifespans are identified, as indicated by block 306. In particular, the compiler determines (and identifies) where in memory the relevant sets will be located and when those memory locations will be valid for that data. Instructions that access those locations during the pertinent lifespans are tagged in accordance with the particular set to which the relevant data belongs, as indicated by block 308. If a tagged instruction generates additional data derived from the initial data that is associated with the set (as indicated by block 310), then that additional data is added to the set (as indicated by block 312) and the process begins again at block 306.

Figure 4:
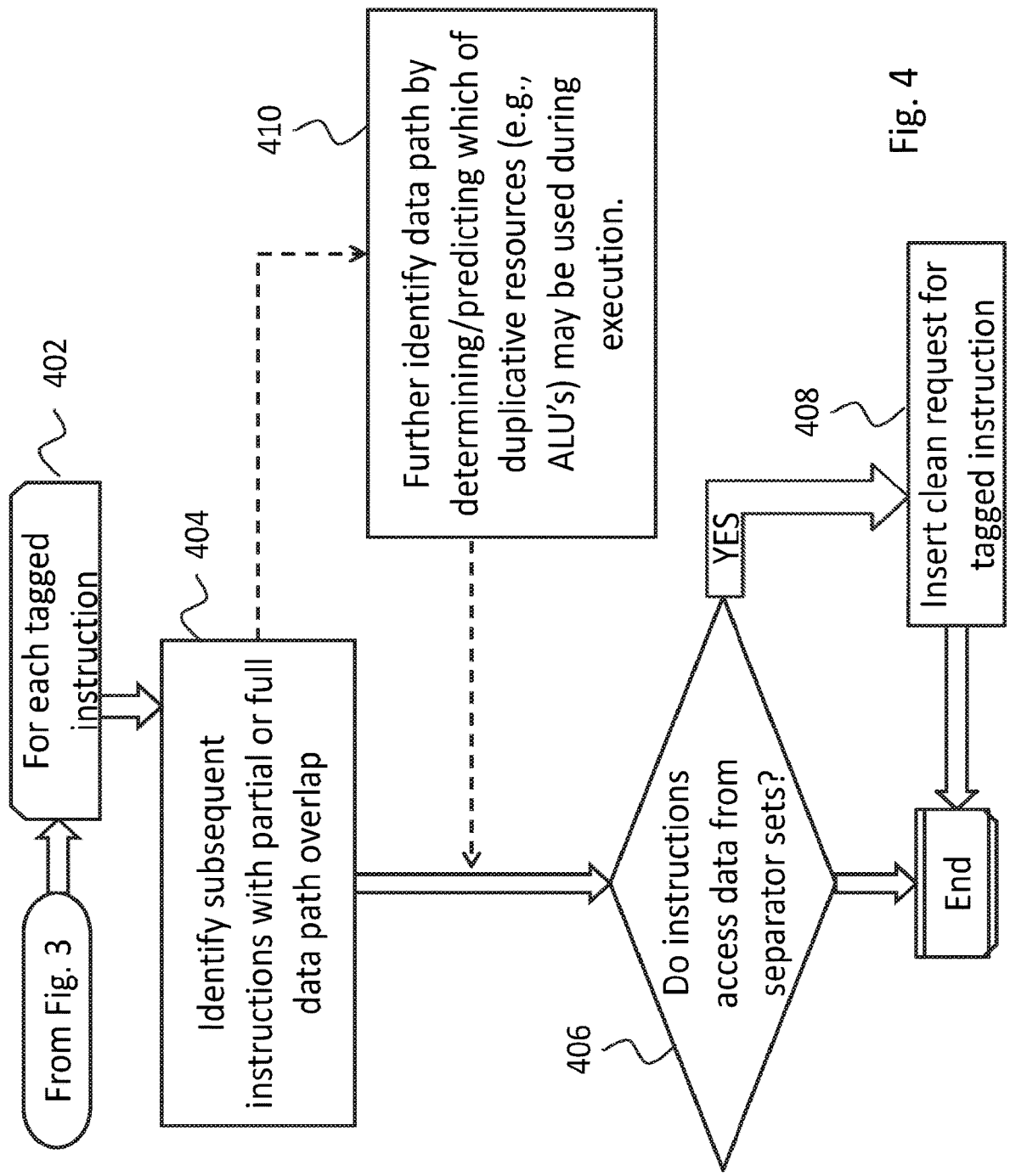
FIG. 4 is a flow diagram also depicting first embodiments.

Once all pertinent data has been added to all received sets, then referring to FIG. 4, in embodiments, the following is done for each tagged instruction (as indicated by block 402). Subsequent instructions that partially or fully overlap the data path of the tagged instruction are identified, as indicated by block 404. Thus, embodiments contemplate that the compiler can look forward sequentially and affirmatively detect instructions that partially overlap with the tagged instruction (e.g., they may overlap with one or more specific resources having known or suspected leakage points such as certain ALUs) or overlap with the entire data path taken by the tagged instruction. Either way, a determination is made whether the identified subsequent instructions access data from separator sets (e.g., sets whose data should not follow data associated with the tagged instruction), as indicated by block 406. If "yes," then a clean request for the tagged instruction is inserted, such that a clean operation will be initiated after the tagged instruction is executed or otherwise where its associated data passes through or is utilized by the resource at issue, as indicated by block 408. As mentioned, embodiments envision at least some of this logic can be implemented by the microprocessor, e.g., a specialized instruction can exist that is recognized by the microarchitecture and that can perform functions such as randomizing or clearing data in a resource.

To effect a clean operation and prevent, e.g., Set B data from following Set A data, embodiments also envision that instructions can be reordered so that the execution of the instruction associated with data/variables from Set B is shifted so that it no longer follows the instruction associated with Set A. Of course, it is contemplated that this be done in a manner that maintains the desired function of the program to which the reordered instructions belong.

In other (or overlapping) embodiments, the operands of given instructions can be swapped in order to inhibit sensitive data from consecutively following each other through a potential leakage point. For example, there can be a leak-inhibiting scenario with the same instruction issued consecutively with data from two sets whose data should not consecutively follow each other, if and only if, the data do not share the same position within the instructions. In such a case, the compiler would swap operand positions within one of instructions, hence changing the opcode without changing the logical result.

Where multiple paths and corresponding resources in a computer system are available and can be used by the flow of logic of an executed program (and thus a compiler cannot completely determine whether partial or full data overlap exists), embodiments contemplate various techniques to address this issue. For example, embodiments envision that the compiler may have access to information that would allow it to determine or at least predict with a high degree of confidence which resources the flow of logic will take, and act accordingly. This is indicated by block 410. However, where such information is not available to the compiler, one solution contemplated by embodiments is that clean instructions can be inserted in a manner that ensures that all possible resources that sensitive back-to-back data may pass through are cleaned. Thus, for example, if the flow of logic of a program dictates that an ALU will be used once, but there are three ALUs available in the computer system (and the ALU to be utilized can only be chosen during execution), embodiments contemplate that all three ALUs can be cleaned after the first sensitive instruction passes through (or is otherwise utilized by) any ALU. Such a multiple-resource cleaning instruction can be implanted as a specialized microprocessor instruction.

Embodiments also contemplate that the multiple resource issue mentioned previously can be addressed by a dynamic tracking device (tracker) that tracks the path of sensitive data (and/or instructions associated therewith) during execution and dynamically inserts clean instructions where appropriate. For example, when sensitive data from Set A is observed passing through buffer X during execution and it is known (or there is a reasonable likelihood) that it will immediately be followed by data from Set B, then a clean instruction operation can dynamically be initiated where, e.g., the compiler was unable to or inadvertently did not provide an appropriate cleaning instruction or any cleaning instruction. As a more specific example, where an initial cleaning instruction is generated by a compiler to clean the buffer, but upon execution (and unknown to the compiler) there are two parallel buffers either of which can be used during execution, the tracker can generate a dynamic cleaning instruction targeted for the appropriate buffer (where otherwise no appropriate cleaning instruction would exist) or at least redirect the initial cleaning instruction. In embodiments, it is generally envisioned that two such parallel resources would be substantially similar to each other.

In embodiments, the path of the instructions during execution can dynamically be tracked by scoreboarding techniques. As indicated previously, one mechanism for implementing a clean operation is to reorder certain instructions. Since a central purpose of scoreboarding is to dynamically schedule a pipeline so that the instructions can execute out of order when there are no conflicts and the hardware is available, this technique is well suited for cleaning by way of reordering of instructions.

Embodiments also envision that a warning or exception can be generated (by the compiler or dynamic tracking device, respectively) when an occurrence arises that warrants attention. For example, if a specific instruction has data associated with Set A as well as Set B (i.e., the instruction is simultaneously associated with data that should be kept separate), a notification of the issue can be generated and corrective steps taken. There can also be situations where, during the course of the execution of the program, the data would become non-sensitive and can be safely combined. Such instances could be indicated by the programmer, which in turn would suppress otherwise generated warnings or exceptions.

In addition to the embodiments depicted by FIGS. 3 and 4, embodiments also envision that each time data from a sensitive set (e.g., from Set A) passes through a resource or path that may contain a leak, a clean operation is implemented. This is indicated by block 502 of FIG. 5. (The other preceding blocks in that figure are the same as in FIG. 3.) Thus, while these embodiments envision possibly receiving separation information (so that they, e.g., at least are aware of which sets are sensitive to leaks, generally), there is no explicit consideration for whether sensitive data from Set B will in fact be following Set A consecutively. Implicitly, however, if an indication is received that Set B data should not follow Set A data, this indicates (and can be said to identify) that Set B data has a substantial chance of consecutively following Set A data (since Set B data is likely to exist, having been received as part of the separator information). Thus, a clean request should be generated at an appropriate leakage point following Set A data (i.e., upon affirmatively detecting that data associated with Set A will pass through the leakage point).

Figure 5:
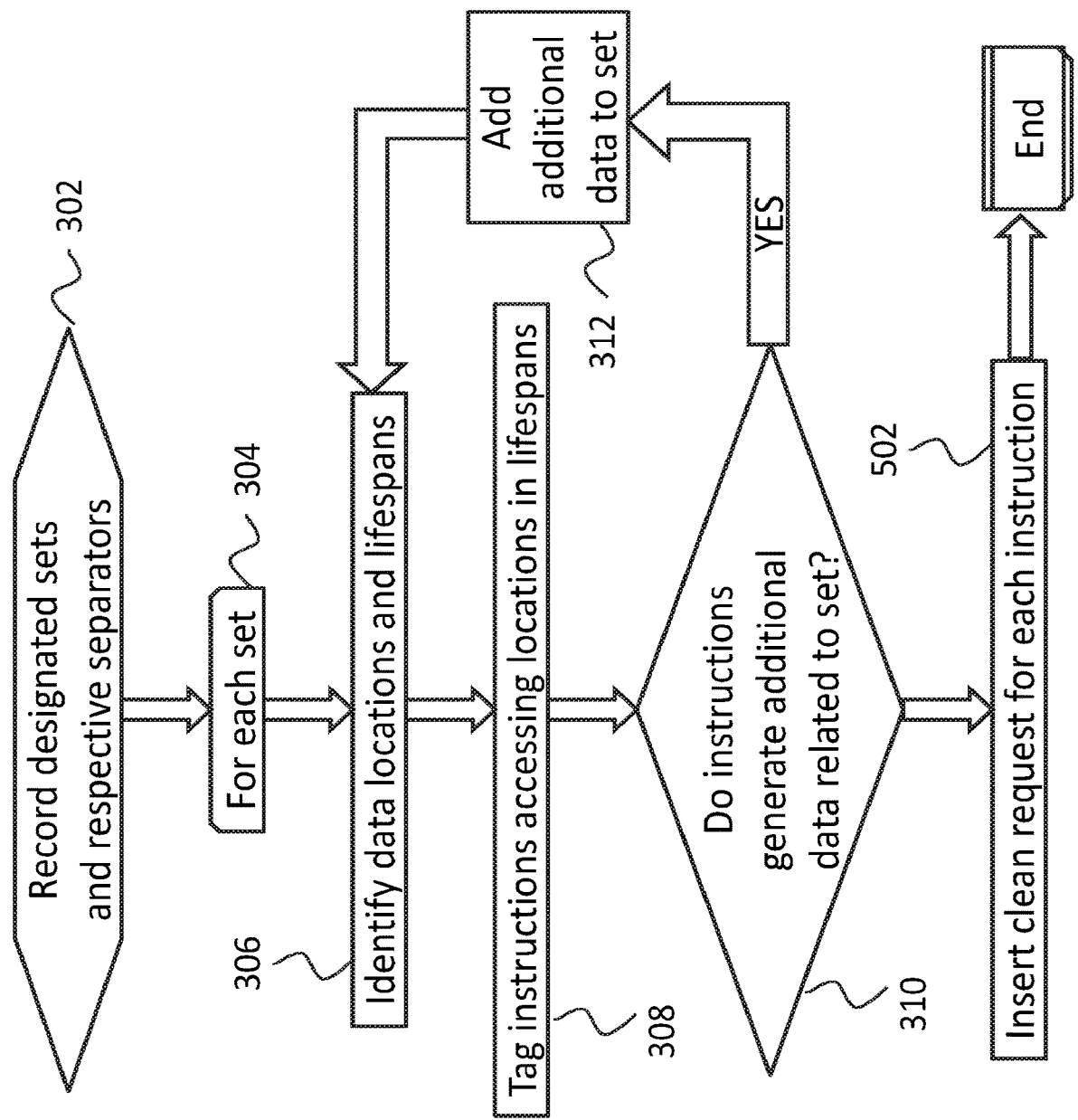
FIG. 5 is a flow diagram depicting second embodiments.

While the embodiments of FIG. 5 are generally more straightforward to implement at the compiler level than those depicted by FIGS. 3-4, it is less efficient at execution time since many more cleaning operations will take place (many of which will likely be unnecessary).

An example depicting usage of separator sets along with a compiled result is shown below. Descriptors have been inserted to indicate to the compiler how to tag the data (e.g., data will be tagged as part of Set A, Set B, etc.). Commented instructions and groups thereof are indicated by dotted-lined boxes with the comments at the upper portion of the box, though other commented areas exist as will be recognized by those skilled in the art.

The example in high-level language (in this case, C) is as follows:

```c
#include <stdio.h>
#include <string.h>
void
print128(unsigned char* v,
         unsigned char* a)
{
    unsigned char b = 0;
    printf(v);
    for (b = 0; b < 16; b++)
    {
        printf("%02hhX", a[b]);
    }
    printf("\n");
}
void
make_share(unsigned char* data,
           unsigned char* mask,
           unsigned char* share)
{
    unsigned short b = 0;
    asm("r0%=: rdrand %0; jae r0%=; r1%=: rdrand %1; jae r1%=" : "=r"(((long*)mask)[0]), "=r"(((long*)mask)[1]));
    for(b = 0; b < 16; b++)
    {
        share[b] = data[b] ^ mask[b];
    }
}
int
main(int argc,
     char** argv)
{
    unsigned char b = 0;
    unsigned char key[16];
    #pragma share("A" : SEP, "B")
    unsigned char key_mask[16];      // assign key_mask array to set A and
                                     // specify set A to be separated from
                                     // set B
    #pragma share("B" : SEP, "A")
    unsigned char key_share[16];     // assign key_share array to set B and
                                     // specify set B to be separated from
                                     // set A
    unsigned char data[16];
    #pragma share("C" : SEP, "D")
    unsigned char data_mask[16];     // assign data_mask array to set C and
                                     // specify set C to be separated from
                                     // set D
    #pragma share("D" : SEP, "C")
    unsigned char data_share[16];    // assign data_share array to set D and
                                     // specify set D to be separated from
                                     // set C
    #pragma share ("E" : SEP, "F")
    unsigned char share0[16];        // assign share0 array to set E and
                                     // specify set E to be separated from
                                     // set F
    #pragma share("F" : SEP, "E")
    unsigned char share1[16];        // assign share1 array to set F and
                                     // specify set F to be separated from
                                     // set E
    // error checking
    if(argc < 3)
    {
        printf("Must supply key and data.\n");
        return -1;
    }
    if(strlen(argv[1]) != 32 || strlen(argv[2]) != 32)
    {
        printf("Key and data must be 128 bits in size.\n");
        return -1;
    }
    // read in key and data
    for(b = 0; b < 16; b++)
    {
        sscanf(&argv[1] [2*b], "%2hhx", &key[b]);
        sscanf(&argv[2] [2*b], "%2hhx", &data[b]);
    }
    // generate key and data shares, and print to the screen
    make_share(key, key_mask, key_share);
    make_share(data, data_mask, data_share);
```

```
    // add key to data using shares and print shares
    for(b = 0; b < 16; b++)
    {
        share0[b] = key_mask[b] ^ data_mask[b];
        share1[b] = key_share[b] ^ data_share[b];
    }
    print128("Share 0: ", share0);
    print128("Share 1: ", share1);
    return 0;
}
```

The compiled version of the previously-noted listing is as follows:

```
mask.o:   file format elf64-x86-64
Disassembly of section .text:
0000000000000000 <print128>:
#include <string.h>
void
print128(unsigned char* v,
         unsigned char* a)
{
   0: 55                    push    rbp
   1: 53                    push    rbx
   2: 48 89 f3              mov     rbx,rsi
   5: 48 8d 6b 10           lea     rbp,[rbx+0x10]
         unsigned char b = 0;
         printf(v);
   9: 31 c0                 xor     eax,eax
#include <string.h>
void
print128(unsigned char* v,
         unsigned char* a)
{
   b: 48 83 ec 08           sub     rsp,0x8
         unsigned char b = 0;
         printf(v);
   f: e8 00 00 00 00        call    14 <print128+0x14>
  14: 0f 1f 40 00           nop     DWORD PTR [rax+0x0]
         for (b = 0; b < 16; b++)
         {
             printf("%02hhX", a[b]);
  18: 0f b6 33              movzx   esi,BYTE PTR [rbx]
  1b: 31 c0                 xor     eax,eax
  1d: bf 00 00 00 00        mov     edi,0x0
  22: 48 83 c3 01           add     rbx,0x1
  26: e8 00 00 00 00        call    2b <print128+0x2b>
         unsigned char* a)
{
    unsigned char b = 0;
    printf(v);
    for(b = 0; b < 16; b++)
  2b: 48 39 eb              cmp     rbx,rbp
  2e: 75 e8                 jne     18 <print128+0x18>
    {
        printf("%02hhX", a[b]);
    }
    printf("\n");
}
  30: 48 83 c4 08           add     rsp,0x8
    printf(v);
    for(b = 0; b < 16; b++)
    {
        printf("%02hhX", a[b]);
    }
    printf("\n");
  34: bf 0a 00 00 00        mov     edi,0xa
}
  39: 5b                    pop     rbx
  3a: 5d                    pop     rbp
    printf(v);
    for(b = 0; b < 16; b++)
    {
        printf("%02hhX", a[b]);
    }
    printf("\n");
```

-continued

```
  3b: e9 00 00 00 00           jmp      40 <make_share>
0000000000000040 <make_share>:
          unsigned char* mask,
          unsigned char* share)
{
     unsigned short b = 0;
     asm("r0%=: rdrand %0; jae r0%=; r1%=: rdrand %1; jae r1%=" :
"=r"(((long*)mask)[0]), "=r"(((long*)mask)[1]));
  40: 48 0f c7 f0              rdrand   rax
  44: 73 fa                    jae      40 <make_share>
0000000000000046 <r163>:
  46: 48 0f c7 f1              rdrand   rcx
  4a: 73 fa                    jae      46 <r163>
  4c: 48 89 06                 mov      QWORD PTR [rsi],rax
  4f: 48 89 4e 08              mov      QWORD PTR [rsi+0x8],rcx
     for(b = 0; b < 16; b++)
     {
          share[b] = data[b] ^ mask[b];
  53: 32 07                    xor      al,BYTE PTR [rdi]
  55: 88 02                    mov      BYTE PTR [rdx],al
  57: 0f b6 46 01              movzx    eax,BYTE PTR [rsi+0x1]
  5b: 32 47 01                 xor      al,BYTE PTR [rdi+0x1]
  5e: 88 42 01                 mov      BYTE PTR [rdx+0x1],al
  61: 0f b6 46 02              movzx    eax,BYTE PTR [rsi+0x2]
  65: 32 47 02                 xor      al,BYTE PTR [rdi+0x2]
  68: 88 42 02                 mov      BYTE PTR [rdx+0x2],al
  6b: 0f b6 46 03              movzx    eax,BYTE PTR [rsi+0x3]
  6f: 32 47 03                 xor      al,BYTE PTR [rdi+0x3]
  72: 88 42 03                 mov      BYTE PTR [rdx+0x3],al
  75: 0f b6 46 04              movzx    eax,BYTE PTR [rsi+0x4]
  79: 32 47 04                 xor      al,BYTE PTR [rdi+0x4]
  7c: 88 42 04                 mov      BYTE PTR [rdx+0x4],al
  7f: 0f b6 46 05              movzx    eax,BYTE PTR [rsi+0x5]
  83: 32 47 05                 xor      al,BYTE PTR [rdi+0x5]
  86: 88 42 05                 mov      BYTE PTR [rdx+0x5],al
  89: 0f b6 46 06              movzx    eax,BYTE PTR [rsi+0x6]
  8d: 32 47 06                 xor      al,BYTE PTR [rdi+0x6]
  90: 88 42 06                 mov      BYTE PTR [rdx+0x6],al
  93: 0f b6 46 07              movzx    eax,BYTE PTR [rsi+0x7]
  97: 32 47 07                 xor      al,BYTE PTR [rdi+0x7]
  9a: 88 42 07                 mov      BYTE PTR [rdx+0x7],al
  9d: 0f b6 46 08              movzx    eax,BYTE PTR [rsi+0x8]
  a1: 32 47 08                 xor      al,BYTE PTR [rdi+0x8]
  a4: 88 42 08                 mov      BYTE PTR [rdx+0x8],al
  a7: 0f b6 46 09              movzx    eax,BYTE PTR [rsi+0x9]
  ab: 32 47 09                 xor      al,BYTE PTR [rdi+0x9]
  ae: 88 42 09                 mov      BYTE PTR [rdx+0x9],al
  b1: 0f b6 46 0a              movzx    eax,BYTE PTR [rsi+0xa]
  b5: 32 47 0a                 xor      al,BYTE PTR [rdi+0xa]
  b8: 88 42 0a                 mov      BYTE PTR [rdx+0xa],al
  bb: 0f b6 46 0b              movzx    eax,BYTE PTR [rsi+0xb]
  bf: 32 47 0b                 xor      al,BYTE PTR [rdi+0xb]
  c2: 88 42 0b                 mov      BYTE PTR [rdx+0xb],al
  c5: 0f b6 46 0c              movzx    eax,BYTE PTR [rsi+0xc]
  c9: 32 47 0c                 xor      al,BYTE PTR [rdi+0xc]
  cc: 88 42 0c                 mov      BYTE PTR [rdx+0xc],al
  cf: 0f b6 46 0d              movzx    eax,BYTE PTR [rsi+0xd]
  d3: 32 47 0d                 xor      al,BYTE PTR [rdi+0xd]
  d6: 88 42 0d                 mov      BYTE PTR [rdx+0xd],al
  d9: 0f b6 46 0e              movzx    eax,BYTE PTR [rsi+0xe]
  dd: 32 47 0e                 xor      al,BYTE PTR [rdi+0xe]
  e0: 88 42 0e                 mov      BYTE PTR [rdx+0xe],al
  e3: 0f b6 46 0f              movzx    eax,BYTE PTR [rsi+0xf]
  e7: 32 47 0f                 xor      al,BYTE PTR [rdi+0xf]
  ea: 88 42 0f                 mov      BYTE PTR [rdx+0xf],al
  ed: c3                       ret
Disassembly of section .text.startup:
0000000000000000 <main>:
}
int
main(int argc,
     char** argv)
{
   0: 41 55                    push     r13
   2: 41 54                    push     r12
   4: 55                       push     rbp
   5: 53                       push     rbx
   6: 48 81 ec 88 00 00 00     sub      rsp,0x88
     unsigned char data_share[16];
```

```
            unsigned char share0[16];
            unsigned char share1[16];
            // error checking
            if(argc < 3)
    d: 83 ff 02                      cmp        edi,0x2
   10: 0f 8e 1e 01 00 00             jle        134 <r1236+0x76>
            {
                printf("Must supply key and data.\n");
                return −1;
            }
            if(strlen(argv[1]) != 32 || strlen(argv[2]) != 32)
   16: 4c 8b 66 08                   mov        r12,QWORD PTR [rsi+0x8]
   1a: 49 89 f5                      mov        r13,rsi
   1d: 4c 89 e7                      mov        rdi,r12
   20: e8 00 00 00 00                call       25 <main+0x25>
   25: 48 83 f8 20                   cmp        rax,0x20
   29: 0f 85 f6 00 00 00             jne        125 <r1236+0x67>
   2f: 49 8b 7d 10                   mov        rdi,QWORD PTR [r13+0x10]
   33: e8 00 00 00 00                call       38 <main+0x38>
   38: 48 83 f8 20                   cmp        rax,0x20
   3c: 0f 85 e3 00 00 00             jne        125 <r1236+0x67>
   42: 31 db                         xor        ebx,ebx
   44: eb 0e                         jmp        54 <main+0x54>
   46: 66 2e 0f 1f 84 00 00          nop        WORD PTR cs:[rax+rax*1+0x0]
   4d: 00 00 00
   50: 4d 8b 65 08                   mov        r12,QWORD PTR [r13+0x8]
   54: 48 8d 2c 1b                   lea        rbp,[rbx+rbx*1]
   58: 48 8d 14 1c                   lea        rdx,[rsp+rbx*1]
            }
            // read in key and data
            for(b = 0; b < 16; b++)
            {
                sscanf(&argv[1][2*b] , "%2hhx", &key[b]);
   5c: be 00 00 00 00                mov        esi,0x0
   61: 31 c0                         xor        eax,eax
   63: 49 8d 3c 2c                   lea        rdi, [r12+rbp*1]
   67: e8 00 00 00 00                call       6c <main+0x6c>
   6c: 48 8d 44 24 30                lea        rax, [rsp+0x30]
                sscanf(&argv[2][2*b], "%2hhx", &data[b]);
   71: 48 89 ef                      mov        rdi,rbp
   74: 49 03 7d 10                   add        rdi,QWORD PTR [r13+0x10]
   78: be 00 00 00 00                mov        esi,0x0
   7d: 48 8d 14 18                   lea        rdx,[rax+rbx*1]
   81: 31 c0                         xor        eax,eax
   83: 48 83 c3 01                   add        rbx,0x1
   87: e8 00 00 00 00                call       8c <main+0x8c>
                printf("Key and data must be 128 bits in size.\n");
                return −1;
            }
            // read in key and data
            for(b = 0; b < 16; b++)
   8c: 48 83 fb 10                   cmp        rbx,0x10
   90: 75 be                         jne        50 <main+0x50>
0000000000000092 <r0221>:
                unsigned char* mask,
                unsigned char* share)
{
    unsigned short b = 0;
    asm("r0%=: rdrand %0; jae r0%=; r1%=: rdrand %1; jae r1%=" :
"=r"(((long*)mask)[0]), "=r"(((long*)mask)[1]));
;Generating KEY MASK
   92: 48 0f c7 f2                   rdrand     rdx
   96: 73 fa                         jae        92 <r0221>
0000000000000098 <r1221>:
   98: 48 0f c7 f0                   rdrand     rax
   9c: 73 fa                         jae        98 <r1221>
   9e: 48 89 54 24 10                mov        QWORD PTR [rsp+0x10],rdx
   a3: 48 89 44 24 18                mov        QWORD PTR [rsp+0x18],rax
    for(b = 0; b < 16; b++)
    {
        share0[b] = key_mask[b] ^ data_mask[b];
        share1[b] = key_share[b] ^ data_share[b];
    }
    print128("Share 0: ", share0);
;Passing 1ˢᵗ SHARE to routine
   a8: 48 8d 74 24 60                lea        rsi,[rsp+0x60]
    unsigned short b = 0;
    asm("r0%=: rdrand %0; jae r0%=; r1%=: rdrand %1; jae r1%=" :
"=r"(((long*)mask)[0]), "=r"(((long*)mask)[1]));
```

```
        for(b = 0; b < 16; b++)
        {
            share[b] = data[b] ^ mask[b];
;Loading KEY MASK
        ad: 66 0f 6f 44 24 10       movdqa      xmm0,XMMWORD PTR [rsp+0x10]
;REQUIRED ONLY IF FOLLOWING EMBODIMENTS IN FIGURE 5
    COMPILER INSTRUCTION/MODIFICATION ADDED TO CLEAN USED DATA PATHS
        for(b = 0; b < 16; b++)
        {
            share0[b] = key_mask[b] ^ data_mask[b];
            share1[b] = key_share[b] ^ data_share[b];
        }
        print128("Share 0: ", share0);
    b3: bf 00 00 00 00              mov         edi,0x0
00000000000000b8 <r0236>:
            unsigned char* mask,
            unsigned char* share)
{
    unsigned short b = 0;
    asm("r0%=: rdrand %0; jae r0%=; r1%=: rdrand %1; jae r1%=" :
"=r"(((long*)mask)[0]), "=r"(((long*)mask)[1]));
;Generating DATA MASK
    b8: 48 0f c7 f2                 rdrand      rdx
    bc: 73 fa                       jae         b8 <r0236>
00000000000000be <r1236>:
    be: 48 0f c7 f0                 rdrand      rax
    c2: 73 fa                       jae         be <r1236>
    c4: 48 89 44 24 48              mov         QWORD PTR [rsp+0x48],rax
    c9: 48 89 54 24 40              mov         QWORD PTR [rsp+0x40],rdx
        for(b = 0; b < 16; b++)
        {
            share[b] = data[b] ^ mask[b];
;Generating KEY SHARE
    ce: 66 0f ef 04 24              pxor        xmm0,XMMWORD PTR [rsp]
;REQUIRED ONLY IF FOLLOWING EMBODIMENTS IN FIGURE 5
    COMPILER INSTRUCTION/MODIFICATION ADDED TO CLEAN USED DATA PATHS
;Loading DATA MASK
    d3: 66 0f 6f 4c 24 40           movdqa      xmm1,XMMWORD PTR [rsp+0x40]
;REQUIRED ONLY IF FOLLOWING EMBODIMENTS IN FIGURE 5
    COMPILER INSTRUCTION/MODIFICATION ADDED TO CLEAN USED DATA PATHS
;Loading DATA
    d9: 66 0f 6f 54 24 30           movdqa      xmm2,XMMWORD PTR [rsp+0x30]
;REQUIRED ONLY IF FOLLOWING EMBODIMENTS IN FIGURE 5
    COMPILER INSTRUCTION/MODIFICATION ADDED TO CLEAN USED DATA PATHS
;Generating DATA SHARE
    df: 66 0 ef d1                  pxor        xmm2,xmm1
;REQUIRED ONLY IF FOLLOWING EMBODIMENTS IN FIGURE 5
    COMPILER INSTRUCTION/MODIFICATION ADDED TO CLEAN USED DATA PATHS
        make_share(data, data_mask, data_share);
        // add key to data using shares and print shares
        for(b = 0; b < 16; b++)
        {
            share0[b] = key_mask[b] ^ data_mask[b];
;Adding KEY in 1$^{st}$ SHARE
    e3: 66 0f ef 4c 24 10           pxor        xmm1,XMMWORD PTR [rsp+0x10]
;ALWAYS REQUIRED
    COMPILER INSTRUCTION/MODIFICATION ADDED TO CLEAN USED DATA PATHS
        unsigned short b = 0;
        asm("r0%=: rdrand %0; jae r0%=; r1%=: rdrand %1; jae r1%=" :
"=r"(((long*)mask)[0]), "=r"(((long*)mask)[1]));
        for(b = 0; b < 16; b++)
        {
            share[b] = data[b] ^ mask[b];
;Storing KEY SHARE
    e9: 0f 29 44 24 20               movaps      XMMWORD PTR [rsp+0x20],xmm0
;REQUIRED ONLY IF FOLLOWING EMBODIMENTS IN FIGURE 5
    COMPILER INSTRUCTION/MODIFICATION ADDED TO CLEAN USED DATA PATHS
        // add key to data using shares and print shares
        for(b = 0; b < 16; b++)
        {
            share0[b] = key_mask[b] ^ data_mask[b];
            share1[b] = key_share[b] ^ data_share[b];
;Adding KEY in 2$^{nd}$ SHARE
    ee: 66 0f ef c2                 pxor        xmm0,xmm2
;REQUIRED ONLY IF FOLLOWING EMBODIMENTS IN FIGURE 5
    COMPILER INSTRUCTION/MODIFICATION ADDED TO CLEAN USED DATA PATHS
        unsigned short b = 0;
        asm("r0%=: rdrand %0; jae r0%=; r1%=: rdrand %1; jae r1%=" :
"=r"(((long*)mask)[0]), "=r"(((long*)mask)[1]));
```

```
        for(b = 0; b < 16; b++)
        {
            share[b] = data[b] ^ mask[b];
;Storing DATA SHARE
    f2: 0f 29 54 24 50            movaps      XMMWORD PTR [rsp+0x50],xmm2
;REQUIRED ONLY IF FOLLOWING EMBODIMENTS IN FIGURE 5
    COMPILER INSTRUCTION/MODIFICATION ADDED TO CLEAN USED DATA PATHS
        make_share(data, data_mask, data_share);
        // add key to data using shares and print shares
        for(b = 0; b < 16; b++)
        {
            share0[b] = key_mask[b] ^ data_mask[b];
;Storing 1st SHARE
    f7: 0f 29 4c 24 60            movaps      XMMWORD PTR [rsp+0x60],xmm1
;ALWAYS REQUIRED
    COMPILER INSTRUCTION/MODIFICATION ADDED TO CLEAN USED DATA PATHS
        share1[b] = key_share[b] ^ data_share[b];
;Storing 2nd SHARE
    fc: 0f 29 44 24 70            movaps      XMMWORD PTR [rsp+0x70],xmm0
;REQUIRED ONLY IF FOLLOWING EMBODIMENTS IN FIGURE 5
    COMPILER INSTRUCTION/MODIFICATION ADDED TO CLEAN USED DATA PATHS
        }
        print128("Share 0: ", share0);
   101: e8 00 00 00 00            call        106 <r1236+0x48>
        print128("Share 1: ", share1);
;Passing 2nd SHARE to routine
   106: 48 8d 74 24 70            lea         rsi,[rsp+0x70]
   10b: bf 00 00 00 00            mov         edi,0x0
   110: e8 00 00 00 00            call        115 <r1236+0x57>
        return 0;
   115: 31 c0                     xor         eax,eax
    }
   117: 48 81 c4 88 00 00 00      add         rsp,0x88
   11e: 5b                        pop         rbx
   11f: 5d                        pop         rbp
   120: 41 5c                     pop         r12
   122: 41 5d                     pop         r13
   124: c3                        ret
        printf("Must supply key and data.\n");
        return -1;
    }
    if(strlen(argv[1]) != 32 || strlen(argv[2]) != 32)
    {
        printf("Key and data must be 128 bits in size.\n");
   125: bf 00 00 00 00            mov         edi,0x0
   12a: e8 00 00 00 00            call        12f <r1236+0x71>
        return -1;
   12f: 83 c8 ff                  or          eax,0xffffffffffffffff
   132: eb e3                     jmp         117 <r1236+0x59>
        unsigned char share1[16];
        // error checking
        if(argc < 3)
        {
            printf("Must supply key and data.\n");
   134: bf 00 00 00 00            mov         edi,0x0
   139: e8 00 00 00 00            call        13e <r1236+0x80>
            return -1;
   13e: 83 c8 ff                  or          eax,0xffffffffffffffff
   141: eb d4                     jmp         117 <r1236+0x59>
```

The aforementioned embodiments have, for purposes of explanation, used examples where, e.g., data from Set A should not be consecutively followed by data from Set B. However, there may also be situations where only the combination of consecutive data from three or more sets would compromise sensitive data. Thus, for example, it may be the case that only when data from Sets A, B and C consecutively follow one another through a potential leakage point that an intervening cleaning operation should be initiated. In that example, there would be no issue of compromising sensitive data if, e.g., data from Set B consecutively followed Set A, as long as it was not then also followed consecutively by data from Set C. While the previously-discussed embodiments herein do envision addressing such multi-set situations, many of the ensuing cleaning operations would be unnecessary. Specifically, per those embodiments, a cleaning operation can be performed every time, e.g., data from Set B would otherwise consecutively follow data from Set A through a potential leakage point, and this would indeed prevent data from A, B and C from consecutively traveling through the leakage point. However, that cleaning operation would be unnecessary unless data from Set C would have consecutively followed data from B. To avoid unnecessary cleaning operations in such situations, embodiments therefore envision that the same general principles and tracking mechanisms discussed previously can be applied to initiate a cleaning operation only when data from such multiple sets (e.g., Sets A, B and C) would otherwise consecutively pass through a potential leakage point.

As mentioned previously, embodiments also envision that certain electronic components can be utilized as a part of various resources to additionally assist in inhibiting leaks. In addition to existing at various distinct components such as memory cells or ALUs, leaks could also exist more implicitly as part of capacitive structures such as buses or bit lines. Since such structures can temporarily store whatever information is driven across them, this stored information can interact with any subsequent information that traverses the same pathway (temporally) or with any nearby information (spatially). For example, FIG. 6A illustrates a bus 630 having an implicit storage element in the form of parasitic capacitance 632. A driver 634 charges and discharges capacitance 632 according to information transmitted by bus 630, and capacitance 632 thereby stores information transmitted by bus 630. Information stored in capacitance 632 may temporally interact with information subsequently transmitted by bus 630, potentially causing information leaks.

Figure 6B:
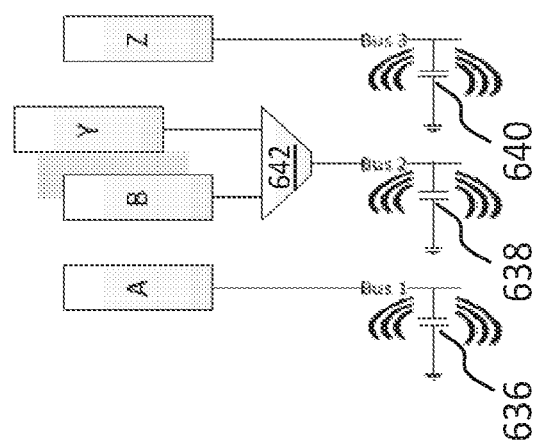
FIG. 6B illustrates a circuit including three busses 1, 2, and 3 in close physical proximity to each other.
Figure 6A:
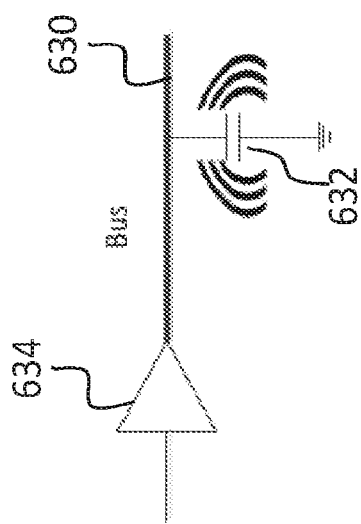
FIG. 6A illustrates a bus having an implicit storage element in the form of parasitic capacitance.

As another example, FIG. 6B illustrates a circuit including three busses 1, 2, and 3 in close physical proximity to each other. Bus 1 is driven by device A, bus 2 is selectively driven by one of devices B through Y based on the state of a multiplexor 642, and bus 3 is driven by device Z. Each of busses A, B, and C have a respective parasitic capacitance 636, 638, and 640. Data driven by device A is stored in capacitance 636, data driven by devices B through Y is stored in capacitance 638, and data driven by device Z is stored in capacitance 640. Data stored in capacitances 636, 638, and 640 may spatially interact, potentially causing information leaks.

To address potential leaks caused by temporal and spatial interactions, embodiments envision that circuits of a dynamic nature (i.e., using a clock signal in its implementation of combinational logic) can be used. By use of such circuits, an oscillating clock signal can readily be employed to assist with periodically inserting intervening data between sensitive data along a pathway having a potential leakage point. Thus, for example, a line having a potential leak can be driven high or pulled low (i.e., cleaned) between the passage of data from Set A and Set B. Such circuits can be designed initially as dynamic circuits, such as discussed below with respect to FIG. 6C, or such circuits can be converted from a static-type circuit to a dynamic circuit during system design, such as discussed below with respect to FIG. 6E.

Figure 6C:
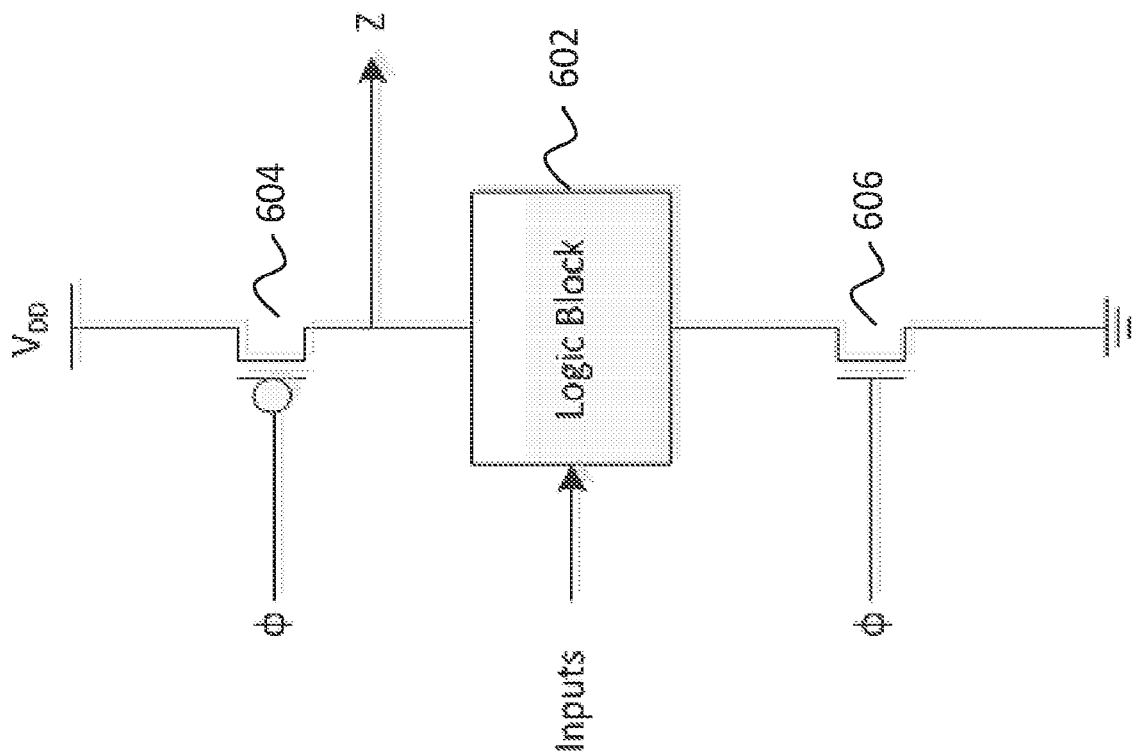
FIG. 6C is a diagram of an example circuit contemplated by (and used with) embodiments disclosed herein.
Figure 6D:
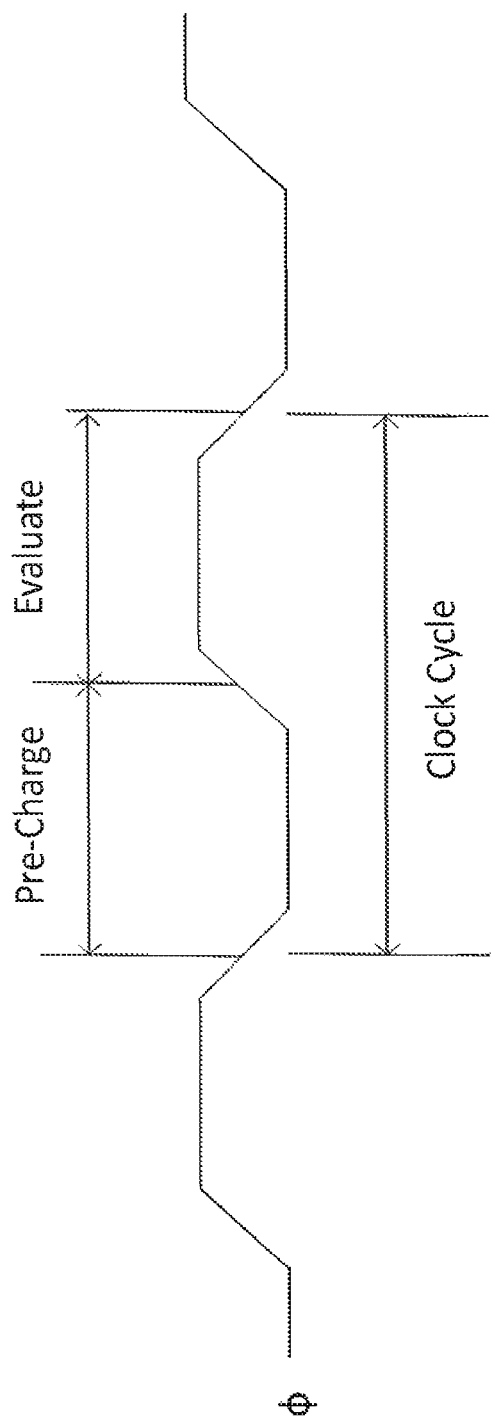
FIG. 6D is a timing diagram for explanation of circuit embodiments contemplated herein.

An example of a dynamic circuit envisioned by embodiments is shown at FIG. 6C. Referring to FIG. 6C, the circuit receives Inputs into a logic block 602 as well as a clock signal $\phi$. As will be appreciated by those skilled in the art, when $\phi$ is 0 (low) during a pre-charge clock phase, the output Z will be driven to 1 (high/$V_{DD}$) by a transistor 604. When $\phi$ goes to a 1 (high) during the next (evaluate) clock phase, a transistor 606 will conditionally discharge Z to 0 based upon the Inputs. Then, in the next (pre-charge) clock phase, $\phi$ is 0 (low) again and Z will again go to a 1 (high/$V_{DD}$), effectively cleaning output Z of whatever results had been placed on it during the previous (evaluate) clock phase. Thus, in each clock cycle (see FIG. 6D) the output Z will be restored to 1 (high/$V_{DD}$) after evaluation is complete and any temporal interaction between the previous and next data is avoided. In other words, a pre-charge will occur between what would otherwise be consecutive data resulting from consecutive evaluate phases. Thus, in the event that this otherwise consecutive data happened to be sensitive data that should not follow each other in back-to-back fashion through the output Z, this type of circuit would automatically place intervening data between them, automatically effectuating a cleaning operation.

Figure 6E:
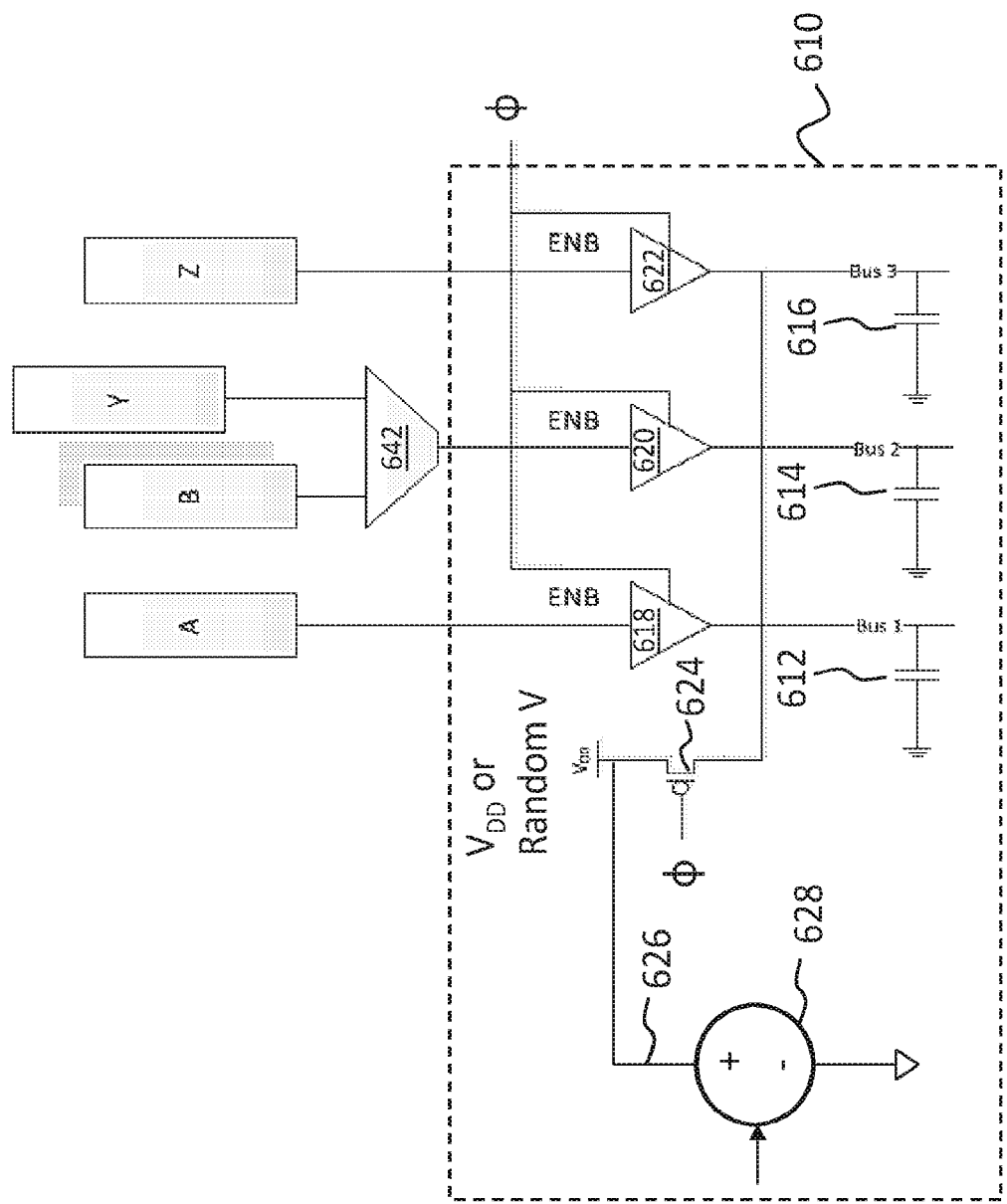
FIG. 6E is a diagram of an alternative example circuit contemplated by (and used with) embodiments disclosed herein.

One type of example structure contemplated by embodiments that can assist with mitigation of leakage caused by spatial interactions is shown in FIG. 6E. Referring to the structure shown in FIG. 6E, embodiments envision a pre-charging circuit 610 electrically coupled to a circuit like that of FIG. 6B, to minimize or eliminate spatial interaction of information stored in parasitic capacitance 612, 614, and 616 of busses A, B, and C, respectively. When $\phi$ periodically is 0 (low) (during a pre-charge phase between evaluate phases), tri-state buffers 618, 620, and 622 are disabled, and a transistor 624 electrically coupled between a power rail 626 and busses 1, 2, and 3 will drive each bus to 1 (high/$V_{DD}$) in view of the clock cycle as explained previously with respect to FIGS. 6C and 6D. When $\phi$ is 1 high (evaluate phase), transistor 624 will operate in its non-conductive state, and tri-state buffers 618, 620, and 622 will drive busses 1, 2, and 3 according to data from device A, multiplexor 642, and device Z, respectively. Tri-state buffers 618, 620, and 622 may be replaced with other drivers having outputs gated by clock signal $\phi$ without departing from the scope hereof.

Also, examples such as the one depicted in FIG. 6E can allow $V_{DD}$ to be a time-varying or random V value, and thus the output during the pre-charge (cleaning) phase would be time-varying or random. This can be accomplished using a voltage generator 628 electrically coupled to the $V_{DD}$ power rail 626 or other mechanisms known to those skilled in the art. In some embodiments, the voltage generator can be controlled according to a time-varying or random signal. An advantage of using a time-varying or random V is to allow for resistance against higher order forms of differential power analysis.

Figure 7:
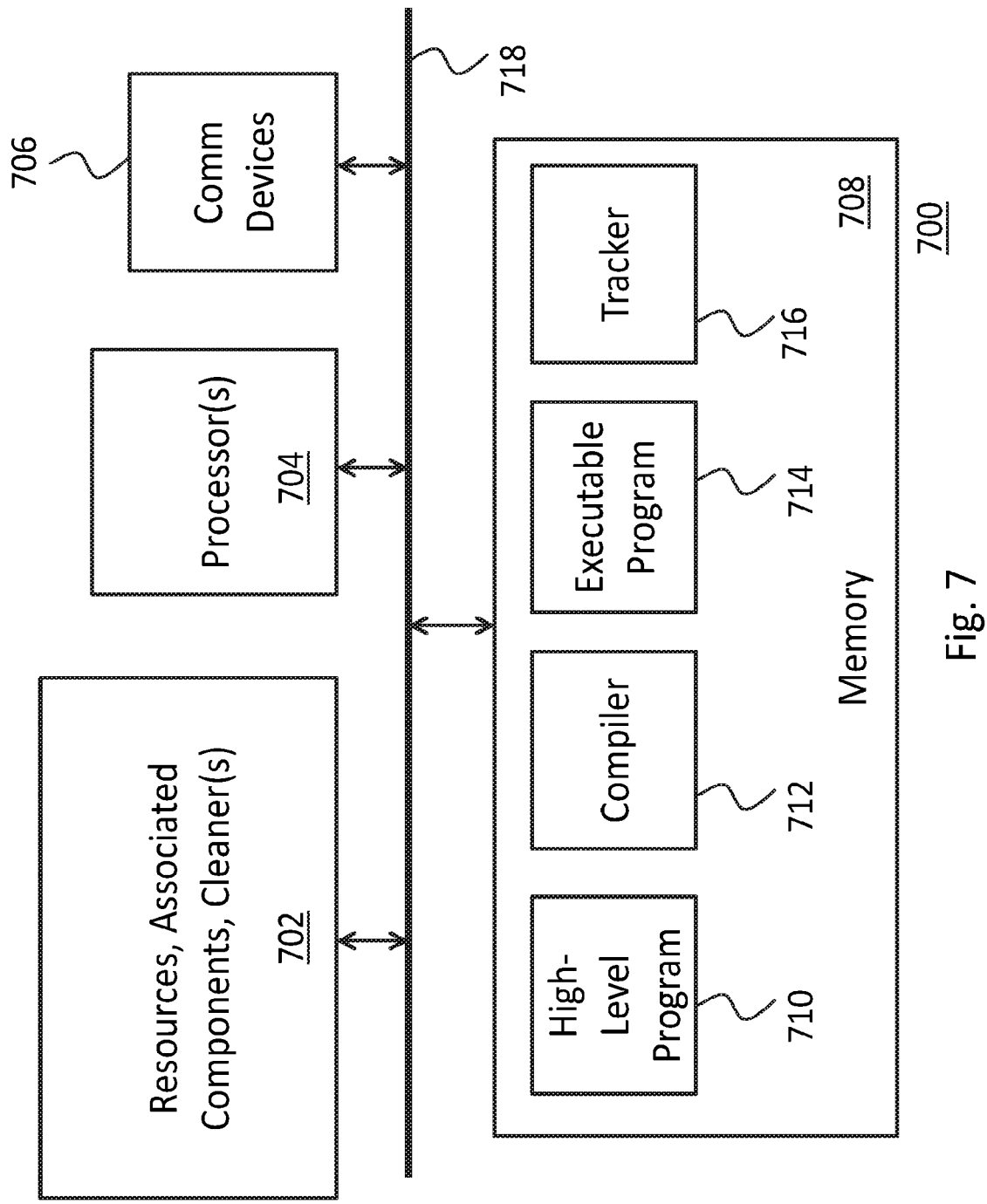
FIG. 7 is a block diagram illustrating an operating environment and aspects of embodiments disclosed herein.

FIG. 7 is a block diagram illustrating aspects of as well as environments for use with embodiments. Referring now to FIG. 7, a system 700 envisions a memory 708 having a high-level program 710 and environment for generating the same (not shown), as well as a compiler 712 and an area containing an executable program 714. Embodiments envision the high-level program can be in any number of programming languages such as C and that the compiler 712 can include any device for creating a machine-readable program as well as any intermediary steps. Embodiments also envision operating using interpretive languages such as Java. A tracker 716 as described previously is also envisioned to reside in memory 708.

The memory 708, thus acts at least in part as a computer-readable medium containing instructions that cause the processor 704 to perform specific functions that are described herein. That medium may be in the form of volatile and/or nonvolatile memory and may be removable, non-removable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; or any other transient or non-transient medium (including distributed/cloud memory) that can be used to store information and can be accessed by a computing device.

Memory 708 is in communication with a bus 718 and/or any other suitable type, number, and/or configuration of wired and/or wireless connections. The processor 704, among other things, enables the compiler 712 to compile the high-level program 710 and to subsequently execute the executable program/results 714 in accordance with previously-mentioned embodiments. At least some resources, associated components, and cleaner(s) 702 are also shown as in communication with other components of system 700. As mentioned, in some embodiments, the processor(s) 704 can implement the cleaning function, and any number of other items shown in FIG. 7 (as well as those not shown) can contain one or more leakage points.

Communications devices 706 include any suitable type, number, and/or configuration of wired and/or wireless devices that transmit information from system 700 to another processing or storage system (not shown) and/or receive information from another processing or storage system (not shown). For example, communications devices 706 may transmit or receive aspects of the various items within memory 708.

It should be understood that the items shown and described in conjunction with FIG. 7 are by way of example and for purposes of explanation, and that embodiments also envision that aspects of FIG. 7 can reside on different systems. For example, high-level program 710, compiler 712 and executable program 714 can each reside on its own computer system with a separate processor and/or that various aspects of system 700 can make use of distributed computing techniques.

The foregoing description has been presented for purposes of illustration and description. It is not intended to be exhaustive or to limit disclosed embodiments to the precise form disclosed, and other modifications and variations may be possible in light of the previously-mentioned teachings. The embodiments were chosen and described in order to best explain various principles and their practical application to thereby enable others skilled in the art to best utilize the various embodiments and various modifications as are suited to the particular use contemplated. It is intended that the appended claims be construed to include other alternative embodiments except insofar as limited by the prior art.

What is claimed is:

1. A method comprising:
    receiving separation information for sensitive data, the separation information indicating that first data and second data should not pass consecutively through a leakage point of a resource;
    identifying a first location of the first data;
    tagging a first instruction that accesses the first location;
    identifying a second instruction that is subsequent to the first instruction and has at least a partial data path overlap with the first instruction;
    determining whether the second instruction accesses the second data; and
    automatically generating a clean request for the first instruction responsive to determining that the second instruction accesses the second data, wherein the clean request is configured to change data at the leakage point subsequent to the first data passing through the leakage point and prior to the second data passing through the leakage point.

2. The method of claim 1, further comprising identifying a first lifespan of the first data, wherein tagging the first instruction comprises tagging the first instruction that accesses the first location in the first lifespan.

3. The method of claim 1, wherein the first data comprises a first set of data and the second data comprises a second set of data.

4. The method of claim 1, wherein the first data comprises a first set of variables anticipated to contain sensitive data and the second data comprises a second set of variables anticipated to contain sensitive data.

5. The method of claim 1, wherein the first data and the second data are part of a first designated set, wherein, for the first designated set, the method further comprises:
    identifying locations and lifespans of the sensitive data;
    tagging instructions accessing the locations in the lifespans;
    determining whether the instructions generate additional data related to the first designated set; and
    adding the additional data to the first designated set responsive to the determining that the instructions generate additional data related to the first designated set.

6. The method of claim 5, further comprising:
    identifying additional locations and lifespans of the additional data;
    tagging additional instructions accessing the additional locations in the lifespans; and
    determining whether the instructions generate further additional data related to the first designated set.

7. The method of claim 1, wherein identifying the second instruction that is subsequent to the first instruction and has at least a partial data path overlap with the first instruction comprises determining which of a set of duplicative resources can be used during execution of the second instruction.

8. The method of claim 1, wherein identifying the second instruction comprises:
    receiving a plurality of instructions;
    designating instructions that use data from the first data set as first instructions, the first instructions comprising the first instruction;
    designating instructions that use data from the second data set as second instructions, the second instructions comprising the second instructions; and
    detecting that the second data associated with at least one of the second instructions would consecutively pass or have a substantial chance of passing through the leakage point after the first data associated with at least one of the first instructions.

9. The method of claim 8, wherein identifying the second instruction further comprises identifying that the at least one of the second instructions has partial or full data overlap with the at least one of the first instructions.

10. The method of claim 1, wherein the clean request comprises at least one of: an instruction for inserting random data, an instruction for inserting zeros, operand swapping, or reordering instructions for execution.

11. The method of claim 10, wherein the clean request comprises a specialized microarchitecture instruction.

12. The method of claim 1, further comprising receiving resource information indicating that the first data and the second data are to pass through one of at least two substantially similar parallel resources, and upon receipt of the resource information, generating a clean request for each of the at least two substantially similar parallel resources.

13. A non-transitory computer-readable medium, comprising instructions stored thereon, that when executed on a processor perform operations comprising:
    receiving separation information for sensitive data, the separation information indicating that first data and second data should not pass consecutively through a leakage point of a resource;
    identifying a first location of the first data;
    tagging a first instruction that accesses the first location;

identifying a second instruction that is subsequent to the first instruction and has at least a partial data path overlap with the first instruction;

determining whether the second instruction accesses the second data; and automatically generating a clean request for the first instruction responsive to determining that the second instruction accesses the second data, wherein the clean request is configured to change data at the leakage point subsequent to the first data passing through the leakage point and prior to the second data passing through the leakage point.

14. The non-transitory computer-readable medium of claim 13, wherein the operations further comprise identifying a first lifespan of the first data, wherein tagging the first instruction comprises tagging the first instruction that accesses the first location in the first lifespan.

15. The non-transitory computer-readable medium of claim 13, wherein the first data comprises a first set of variables anticipated to contain sensitive data and the second data comprises a second set of variables anticipated to contain sensitive data.

16. The non-transitory computer-readable medium of claim 13, wherein the first data and the second data are part of a first designated set, wherein, for the first designated set, the operations further comprise:

identifying locations and lifespans of the sensitive data;

tagging instructions accessing the locations in the lifespans;

determining whether the instructions generate additional data related to the first designated set;

adding the additional data to the first designated set responsive to the determining that the instructions generate additional data related to the first designated set;

identifying additional locations and lifespans of the additional data;

tagging additional instructions accessing the additional locations in the lifespans; and determining whether the instructions generate further additional data related to the first designated set.

17. A system comprising:

a resource that is charged or discharge in connection with data within the resource being changed;

a memory to store a first instruction and a second instruction; and a processor operatively coupled to the memory, the processor to:

receive separation information for sensitive data, the separation information indicating that first data and second data should not pass consecutively through a leakage point of the resource;

identify a first location of the first data;

tag the first instruction that accesses the first location;

identify that the second instruction is subsequent to the first instruction and has at least a partial data path overlap with the first instruction;

determine whether the second instruction accesses the second data; and automatically generate a clean request for the first instruction responsive to determining that the second instruction accesses the second data, wherein the clean request is configured to change data at the leakage point subsequent to the first data passing through the leakage point and prior to the second data passing through the leakage point.

18. The system of claim 17, further comprising a tracking device to track a path of the second data within the system and, upon receipt of an indication that the second data follows the first data through the leakage point with no intervening cleaning instruction, generate a dynamic cleaning instruction so that a cleaning operation is initiated after the first data passes through the leakage point.

19. The system of claim 17, wherein the resource is one of an arithmetic logic unit (ALU), a data path, a buffer, or a bus.

20. The system of claim 17, wherein the resource comprises one or more electronic components, and wherein the clean request is to change the data at the leakage point by periodically driving a voltage across a portion of the one or more electronic components.

* * * * *